（12） United States Patent
Wolfe

(10) Patent No.: US 8,687,533 B2
(45) Date of Patent: Apr. 1, 2014

(54) ENERGY RESERVATION IN POWER LIMITED NETWORKS

(75) Inventor: Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 949 days.

(21) Appl. No.: 12/429,524

(22) Filed: Apr. 24, 2009

(65) Prior Publication Data

US 2010/0271994 A1    Oct. 28, 2010

(51) Int. Cl.
*G08C 17/00* (2006.01)
*H04B 1/60* (2006.01)
*H04B 17/02* (2006.01)
*H04B 7/15* (2006.01)
*H04B 1/38* (2006.01)

(52) U.S. Cl.
USPC ............... 370/311; 455/9; 455/11.1; 455/574

(58) Field of Classification Search
USPC ............................... 370/311; 455/9, 11.1, 574
See application file for complete search history.

(56) References Cited

U.S. PATENT DOCUMENTS

| 6,721,580 B1* | 4/2004 | Moon .......................... 455/574 |
| 2004/0230638 A1* | 11/2004 | Balachandran et al. ...... 709/200 |
| 2005/0206530 A1* | 9/2005 | Cumming et al. ........ 340/870.02 |
| 2008/0102903 A1* | 5/2008 | Schultz et al. ................ 455/574 |
| 2009/0046611 A1* | 2/2009 | Ryu et al. ...................... 370/311 |

* cited by examiner

*Primary Examiner* — Noel Beharry
*Assistant Examiner* — Kodzovi Acolatse
(74) *Attorney, Agent, or Firm* — Hope Baldauff, LLC

(57) ABSTRACT

Technologies are described herein for reserving energy at network nodes within a wireless network and establishing energy threshold levels within the network nodes to suspend or maintain certain operational states as supported by time varying energy levels. Energy within the network node can be reserved for processing a critical message in response to receiving a reservation request. An energy level threshold for a network node within a wireless network can be adjusted in response to receiving a reservation request. Message transmission can be enabled in response to the monitored energy level being above the energy level threshold. Message transmission may be suspended in response to the monitored energy level being below the energy level threshold.

10 Claims, 6 Drawing Sheets

ENERGY RESERVATION IN POWER LIMITED NETWORKS

BACKGROUND

Wireless networking technology can apply to a very broad range of devices. Certain wireless devices may operate on very low power to support increased battery life, battery size reduction, or added system load. The wireless devices may together form a network in an ad hoc manner. Such an ad hoc network may be arranged without concern for the ambient radio frequency (RF) environment or concern for transient channel characteristics. A consequence of low power operation in a potentially high noise environment may be lossy communication channels. Energy expenditure per unit time may be extremely limited in systems that derive energy from solar arrays, wind, mechanical waves, or electromagnetic waves. Wireless networks of such devices may rapidly lose efficiency when network traffic increases. It is with respect to these considerations and others that the disclosure made herein is presented.

SUMMARY

Technologies are described herein for reserving energy at network nodes within a wireless network and establishing energy threshold levels within the network nodes to suspend or maintain certain operation states as supported by time varying energy levels. An energy level of a network node within a wireless network can be monitored. An energy level threshold for the network node can be established. Message transmission can be enabled in response to the monitored energy level being above the energy level threshold. Message transmission may be suspended in response to the monitored energy level being below the energy level threshold. Energy within the network node can be reserved for processing a critical message in response to receiving a reservation request. The energy reservation can involve manipulating one or more energy level thresholds.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
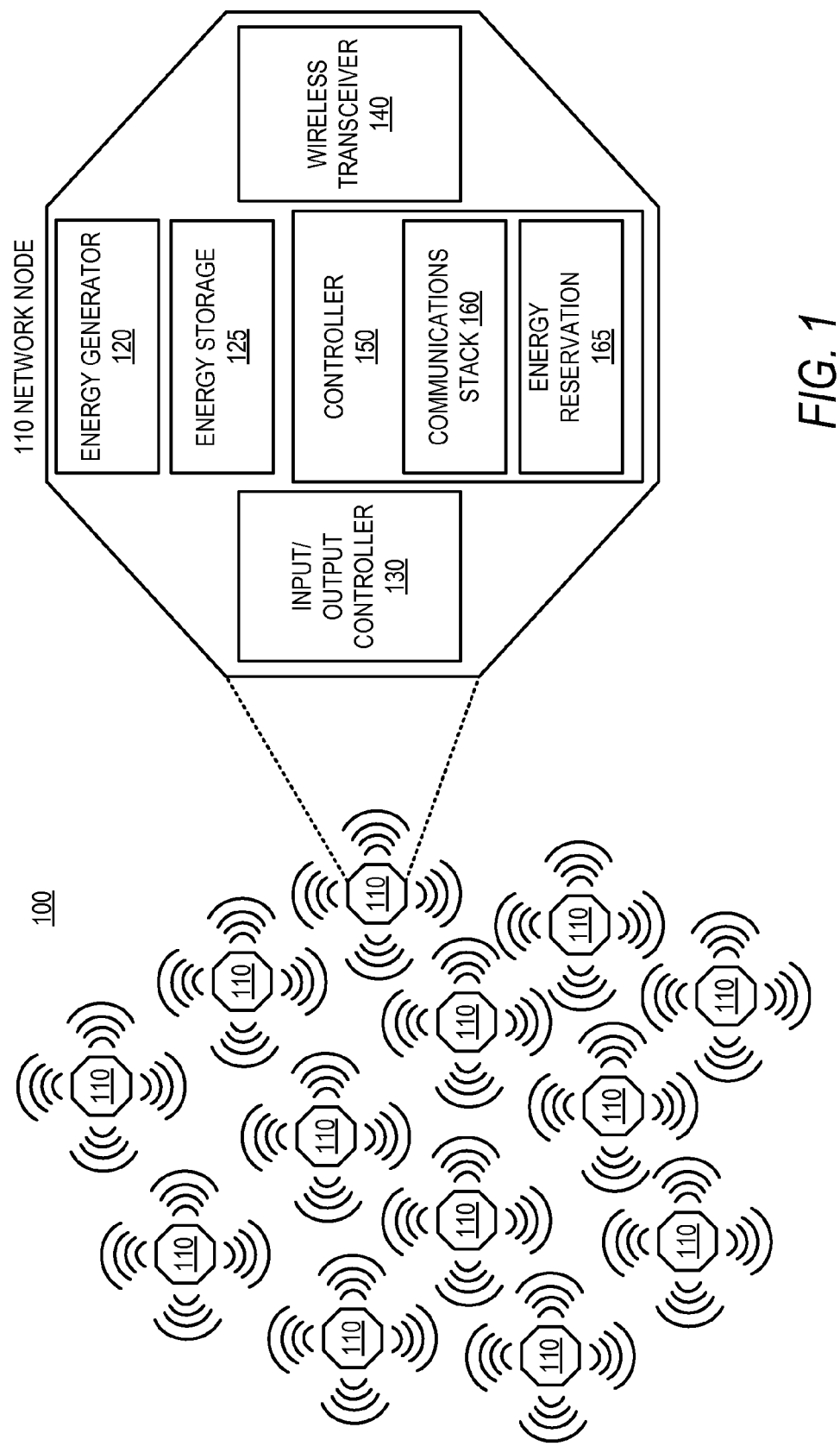
FIG. 1 is a network diagram illustrating a power limited wireless network and a network node.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the technology generally described herein, and illustrated in the FIGS., can be arranged, substituted, combined, separated, and designed in a wide variety of different configurations, all of which are explicitly contemplated herein.

The following detailed description is directed to technologies for defining minimum energy thresholds for various operational states of wireless network nodes. The thresholds can support maintaining the network node energy levels in certain ranges for different operational states. The thresholds can support suspending certain operations until additional energy is stored to support those operations. Energy can be reserved for handling specific tasks such as relaying critical messages. The energy reservations can be made by appropriately manipulating the energy threshold levels.

Turning now to FIG. 1, a functional block diagram illustrates a power limited wireless network 100 and a network node 110 according to an embodiment presented herein. Wireless devices acting as network nodes 110 may operate on limited power. Low power operation may support increased battery life, reduced battery sizes, or increased system load. A low power wireless device may generally support relatively low data rates. Network nodes 110 may be deployed in an ad hoc manner. There may be little consideration of the ambient radio frequency (RF) noise in the operating environment. Similarly, there may be little consideration of transient channel characteristics. Due to a combination of low power operation and high noise environments, the communication channels may be imperfect or lossy. Such an ad hoc wireless network 100 may be implemented for a sensor network, consumer electronics, home automation, entertainment devices, industrial control, land management systems, and various other electronic systems requiring interconnection.

The network 100 may comprise a set of network nodes 110 in which the energy expenditure per unit time is extremely limited. For example, the available power for a small solar-powered network node 110 may be about 50-100 mW. Similarly, the available power for a network node 110 powered by an electromagnetic field may be less than ten microwatts.

The network nodes 110 may obtain their operating energy from a restricted source. For example, the energy source may be a small solar array, a wind conversion system, a wave based power system, a system for extracting power from electromagnetic fields, or various other examples of low power delivery systems. A network node 110 may be able to store incoming power in order to build up an energy reserve. This stored reserve can support a burst of network traffic. However, the overall energy per unit time may be inadequate to support continuous communication over the network 100. Such a network 100 may use any transmission medium for its communication link channels. Free-space optical channels and wireless RF channels are examples where the energy cost of transmission can be high and techniques may be leveraged to increase the reliability of transmissions in noisy environments. These techniques may leverage increasing transmit power levels or more sophisticated, and power-hungry, reception circuits and algorithms.

When the network 100 is operating on limited power, increases in network traffic can introduce inefficiencies in the operation of the network 100. For example, if an individual network node 110 in the network 100 expends its energy reserves transmitting or relaying a message, or set of messages, the network node 110 may fail to complete the transmission of a subsequent message due to inadequate available power. Such a failed transmission may then cause additional messages to fail to reach their destination. These failed messages may deplete the energy reserves of the network nodes 110 that transmit the messages partially through the network 100. Moreover, this may result in no useful work being accomplished when the transmitted messages fail at some later network node 110 and are not delivered to the final destination. Such a system may thrash with partial message transmissions to the point where no messages are ever successfully delivered. Approaches to energy reservation presented herein may be used to mitigate such undesirable transmission inefficiencies.

An example of a network node 110 may include a controller 150. The controller 150 may be an embedded computing system using a microprocessor, a multiprocessor, a DSP processor, a microcontroller, a core processor, an ASIC, an FPGA, other programmable logic, or any other programmable controller or specialized digital circuitry. The controller 150 can include modules that may be implemented as software, firmware, circuits, logic, programmable logic, or other structures operable to support the desired functionality. An example of such a module may include a communications stack 160 for handling the reception and transmission of messages onto the channels of the network 100. The communications stack 160 may operate with a wireless transceiver 140. The wireless transceiver 140 may interface signals within the controller 150 to and from a communication channel such as a wireless RF channel, a free-space optical channel, or any other such communications channel known in the art.

Another example of a module associated with the controller 150 may be an energy reservation module 165. The energy reservation module 165 may implement various embodiments of energy reservation techniques presented herein. The controller 150 may interface with one or more input/output (I/O) controllers. An I/O controller 130 may comprise peripherals, or peripheral interfaces for receiving inputs and outputs. Examples of inputs may include sensor data, switches, buttons, energy monitors, buses, interface ports, and so forth. Example of outputs may include lights, indicators, displays, actuators, buzzers, interface buses, interface ports, and so forth.

The network node 110 may include an energy generator 120. The energy generator may be a solar array, a wind generator, a wave generator, a turbine, a thermal generator, and electromagnetic generator, any other mechanism for generating energy for use within the network node 110, or any combination thereof. Energy from the energy generator 120 may be stored to a device for energy storage 125. The energy storage 125 may include a chemical cell, a battery, a fuel cell, a capacitor, a super capacitor, an ultra capacitor, a capacitor bank, a flywheel, a thermal store, any other mechanism for storing energy, or any combination thereof.

Figure 2:
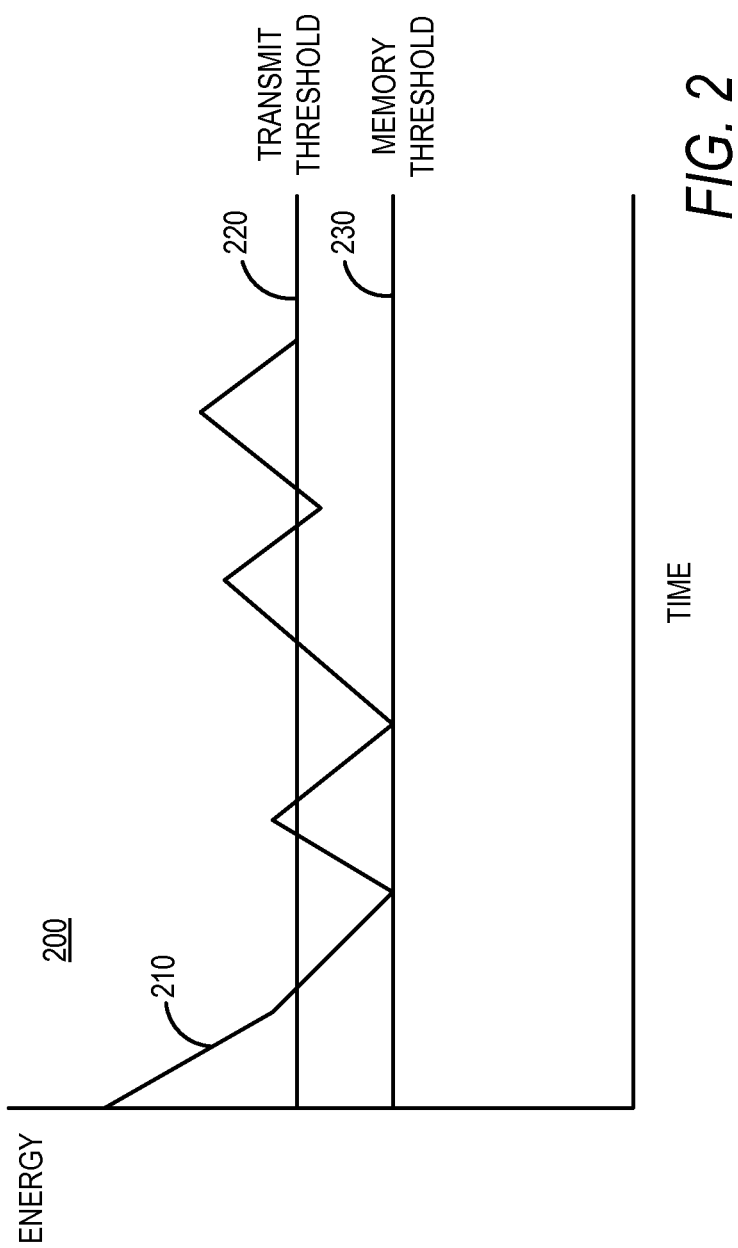
FIG. 2 is a plot illustrating a time function of energy in a network node relative to energy thresholds.

Turning now to FIG. 2, a plot 200 illustrates a time varying energy curve 210 associated with a network node 110 according to an embodiment presented herein. The variation of the energy curve 210 over time can relate to storing and using energy by the network node 110. Increases in the energy curve 210 may represent the build up of energy within the energy storage 125 as the energy is generated by the energy generator 120. Decreases in the energy curve 210 may represent the consumption of energy from the energy storage 125 as energy is used to operate the network node 110 and to power the transmitter within the wireless transceiver 140 in order to operate the network 100. The network node 110 may be powered by either the power provided by energy generator 120, the power provided by stored energy from energy storage 125, or some combination of the two sources.

Energy thresholds may be used for managing energy consumption. This management may be implemented within the energy reservation module 165 of network node 110. An example energy threshold can be a memory threshold 230. A memory threshold 230 can be established within a network node 110 as a level for sustaining basic operations, such as maintaining the memory within the network node 110. When the energy level, represented by the energy curve 210, drops to the memory threshold 230, the normal operating state of the network node 110 can transition to a low power mode, sleep mode, or suspended mode in order to maintain the energy at, above, or near the memory threshold 230. This can prevent the energy level from further dropping and falling below the memory threshold 230. Maintaining the energy level above the memory threshold 230 can maintain basic life support and provide memory maintenance power to the network node 110 until addition energy can be stored.

Another example of an energy threshold within the network node 110 can be a transmit threshold 220. A transmit threshold 220 can be maintained within a network node 110 to establish the level of stored energy, represented by the energy curve 210, for operation of the wireless transceiver 140 to participate in the network 100. When the present energy level within a network node 110 is above the transmit threshold 220, the network node 110 may enable its network interface systems such as the wireless transceiver 140 and participate in the wireless network 100. When the energy level of a network node 110 falls below the transmit threshold the network node 110 may cease some or all network operations until additional energy is stored.

The memory threshold 230 and the transmit threshold 220 can be determined based on the memory retention characteristics and the transmit energy requirements of a specific embodiment. The memory threshold 230 may be based on a minimum voltage level required for the particular memory device to retain its stored values. For example, when a memory device operates on two volts, and the energy is stored in a 10 µF capacitor, the relationship that Energy=½ $CV^2$ may be used to determine a memory threshold 230 of 20 microJoules. This may assume that the current energy supply can maintain operation and no reserve is required. Alternatively, the memory threshold 230 may be determined based on the ability to retain stored memory for a given period of time without additional energy being supplied. For example, if the memory consumes 1 mW in standby mode and reserves for one hour are desired, then the memory threshold 230 may be specified as about 3.6 Joules or more.

The transmit threshold 220 can be determined by adding a differential amount to the memory threshold 230 for transmitting the desired data. For example, if the energy required to transmit 1 bit is 1 milliJoule and the maximum message size is 1536 bits, then the transmit threshold may be selected to be 1.536 Joules higher than the memory threshold 230. Alternatively, a fixed amount of reserve energy may be included, for example about 1 to 5 Joules higher than the memory threshold 230.

According to some embodiments, ceasing network operations below the transmit threshold 220 may involve halting transmission or it may involve suspending both reception and transmission. If messages are received while the network node 110 does not contain an adequate energy reserve to transmit the messages successfully, the messages may be stored in memory until the energy reserve has sufficiently built up to support transmission. Where only transmission is suspended, messages may still be received. The received messages may be buffered for relay or response processing once the energy level increases enough to surpass the transmit threshold 220 and support operating the transmitter portion of the wireless transceiver 140. According to other embodiments, the transmit threshold 220 may be established such that one fixed-size network packet can be transmitted without the energy level dropping below the memory threshold 230.

The delaying of network messaging until energy levels permit transmission may successfully deliver more messages without network thrashing. However, messages can back up in the storage nodes when their delivery is delayed. Also, the delays may cause timeouts to abandon messages dependent on end-to-end acknowledgement within a specified time window. Combining the technique of delaying messages until more energy is stored up with an energy reservation technique can support delivering critical messages through the network 100 as rapidly as possible without increased timeout failures.

Figure 3:
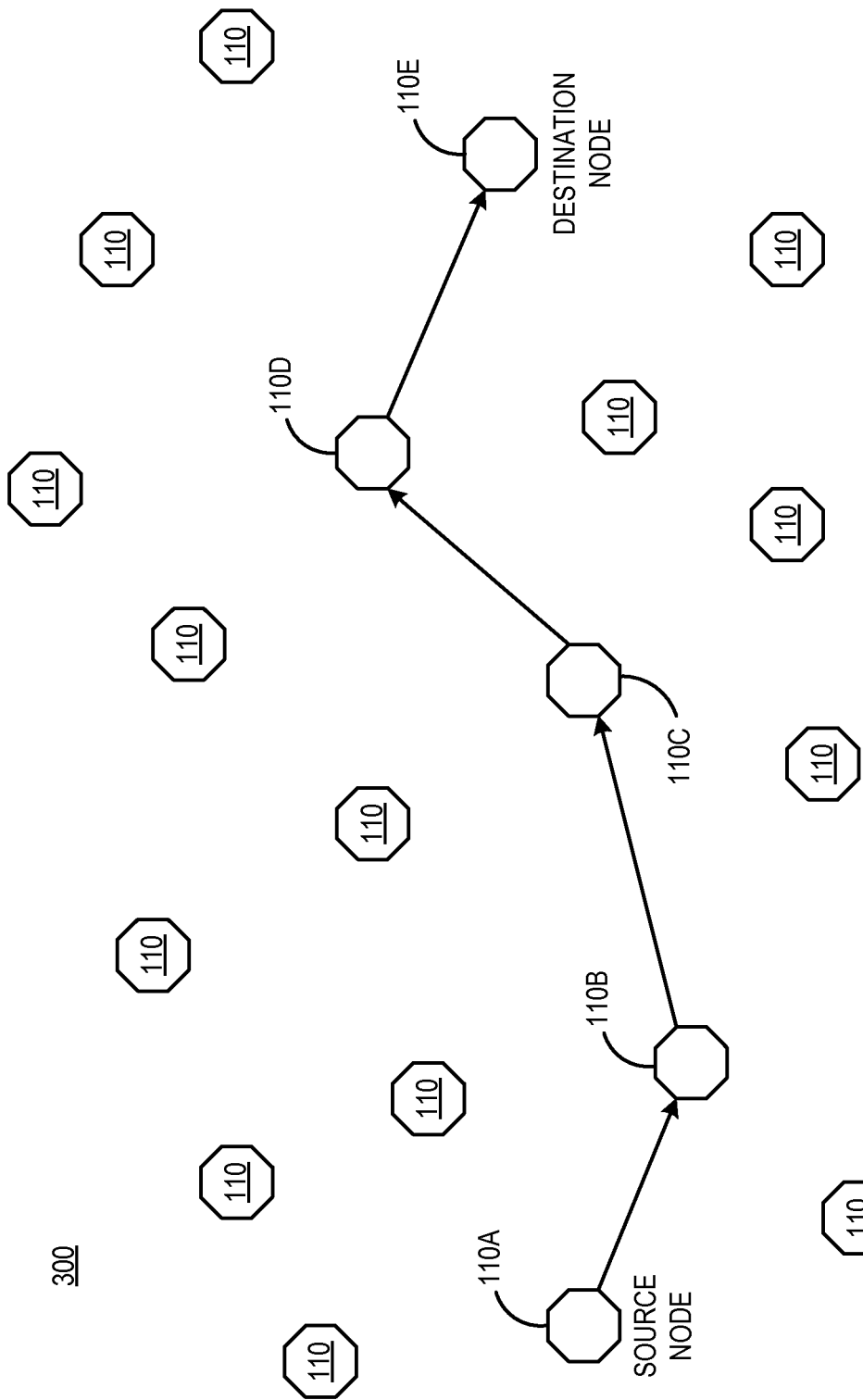
FIG. 3 is a network diagram illustrating path reservation and energy reservation in a wireless network.

Turning now to FIG. 3, a network diagram 300 illustrates path reservation and energy reservation in a wireless network 100 according to embodiments presented herein. A critical message can be any message having a priority of delivery on over other messages within the network system. The critical message can be delivered from a source node 110A through intermediate nodes, or relay nodes 110B-110D, to a destination node 110E. Because of the priority to have the critical message delivered, resources may be reserved for the critical message in attempt to prevent a delivery failure. Each network node 110 involved in the transmission path can reserve energy specifically for the transmission of the critical message. The reservation can be established based on a pre-notification for the critical message.

When a critical message is to be transmitted, a reservation message may be sent from the source node 110A, through any intermediate relay nodes, and to the destination node 110E for the critical message. The reservation message can be used to establish the path through which it travels the network. The reservation message may reserve the network path as a set of node hops. The reservation message may also reserve the transmission energy to be used for processing and transmission at each hop. The reservation message can be much smaller that the actual critical message and thus require less energy to propagate through the network 100.

According to some embodiments, the reservation message may not require an acknowledgement from the destination node 110E that the reservation message was delivered. Since there is no acknowledgement, the source node 110A may send the message and then assume that it will be eventually delivered. As such, the reservation message should not be allowed to time out. Thus, the reservation message can be stored by network nodes 110 that do not have adequate energy reserved to propagate the reservation message. Once the energy is built up within such a node, the reservation message can be propagated forward within the network 100. Once a reservation message is received, the network node 110 may delay other traffic to reserve energy for the propagation of the path reservation message and the subsequent delivery of the critical message itself. Alternatively, the reservation message may contain a reservation time. As the reservation time is approaching or has been reached, the network node 110 may delay other traffic to reserve energy for the propagation of the path reservation message and the subsequent delivery of the critical message itself.

After a reservation message is sent, a specified delay period may be introduced prior to transmission of the critical message into the network 100. Each network node 110 that receives the critical message can prioritize it for transmission before any other network messages. Once the critical message arrives at the destination node 110E, an acknowledgement can be returned to the source node 110A. If the acknowledgement is not received at the source node 110A within a specified timeout period, it is assumed that the critical message failed. To recover from such a failure, a new reservation message may be sent followed by an increased delay time before the critical message is resent. Increasing the delay time may support full propagation through the network 100 of the reservation message followed by enough time for energy to store up at each network node 110 to support the full transmission of the critical message through the network 100.

According to embodiments, non-critical traffic can be delayed at a network node 110 until an acknowledgement message associated with a critical message is received by the network node 110 and forwarded back to the critical message source node 110A. Alternatively, the traffic delay may be maintained at each network node 110 until the timeout period for the critical message has expired or the acknowledgement message is received by the network node 110 and forwarded back to the critical message source node 110A. Increasing the transmit threshold 220 for a network node 110 during the timeout period can reserve energy adequate to receive and forward the acknowledgement message while waiting for the acknowledgement message.

According to embodiments, an acknowledgement may also be supplied for the initial reservation message. Transmission of the critical message can then be delayed until the reservation message has been acknowledged. If the reservation message times out, the reservation request may be repeated.

According to embodiments, each network node 110 may reserve energy specifically for the transmission of the critical message. This reservation may be based on a pre-notification reservation message that includes the length of the critical message. Network nodes 110 may use the critical message length information in the reservation message to increase their transmit threshold 220. Increasing the transmit threshold 220 can reserve adequate energy to support immediately delivering the critical message when it arrives. When the critical message is received by a network node 110, relaying of the critical message may be prioritized ahead of other network traffic. Once the critical message has been relayed, the transmit threshold 220 may be reset to the previous level. If a reservation time is also present in the reservation message, the transmit threshold 220 may be increased at a predetermined time prior to the reservation time.

According to embodiments, a reservation message may be sent to the destination node 110E associated with the critical message. The reservation message can include the length of the critical message and a reserved delivery time. This time can be a delay relative to the reservation message or the time can be an absolute time. Network nodes 110 along the reserved path may then increase their transmit threshold 220 to reserve adequate energy for immediate delivery of the critical message once it arrives. The higher transmit threshold 220 may be maintained until the reserved delivery time or some predetermined time relative to the reserved delivery time at which point the transmit threshold 220 can be lowered to its original energy level. When a critical message is received by a node, it can be prioritized ahead of other network traffic. The transmit threshold 220 may be reset to the previous level once the critical message is processed.

The values for increasing transmit thresholds 220 to support energy reservation for critical messages can be based on a length of the critical message. When a network node 110 can predict that it may need longer than the typical delay period to store up enough energy to properly handle the critical message delivery and acknowledgement, an acknowledgement to the reservation message may involve suggesting to the source node 110A an increase in the delay period between the reservation message for a critical message and the actual critical message itself.

Figure 4:
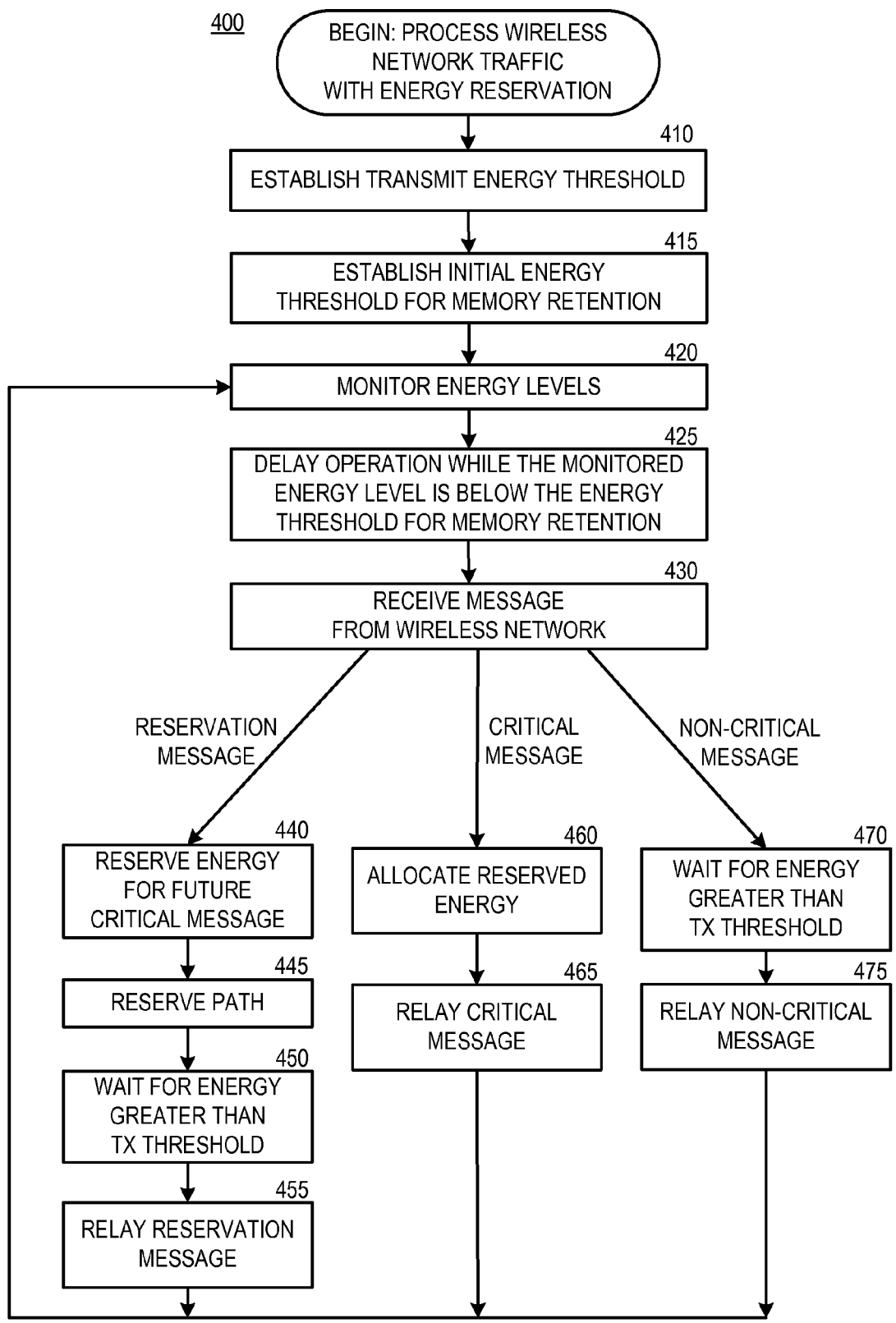
FIG. 4 is a flow diagram illustrating a process for handling wireless network traffic with energy reservation.

Referring now to FIG. 4, additional details will be provided regarding the embodiments presented herein for energy reservation in power limited networks. In particular, FIG. 4 is a flow diagram illustrating aspects of a process 400 for handling wireless network traffic with energy reservation according to aspects of an embodiment presented herein.

It should be appreciated that the logical operations described herein are implemented as: (1) a sequence of computer implemented acts or program modules running on a computing system; and/or (2) interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 400 can begin at operation 410, where an energy level is established as the transmit threshold 220. A transmit threshold 220 can be maintained within a network node 110 to establish the level of stored energy for operation of the wireless transceiver 140 to communicate with the wireless network 100. When the present energy level within a network node 110 is above the transmit threshold 220, the network node 110 may enable its network interface systems such as the wireless transceiver 140 and participate in the wireless network 100. When the energy level of a network node 110 falls below the transmit threshold 220, the network node 110 may suspend some or all network operations until additional energy is stored up. The transmit threshold 220 can be established based upon an average energy, initial energy, peak energy, rate of energy usage, rate of energy generation, or any combination thereof, wherein the combining may involve scaling or any other relationship or function.

At operation 415, an energy level is established as the memory threshold 230. A memory threshold 230 can be established within a network node 110 as a level for maintaining the memory within the network node 110 and for sustaining basic operations. When the energy level drops to the memory threshold 230, the normal operating state of the network node 110 can transition to a low power mode, suspended mode, or sleep mode in order to maintain energy at, above, or near the memory threshold 230. This can prevent the energy level from further dropping and falling below the memory threshold 230. The memory threshold 230 can be established based upon the average energy, initial energy, peak energy, the rate of energy usage, the rate of energy generation, the energy required for memory retention, or any combination thereof wherein the combining may involve scaling or any other mathematical function.

At operation 420, the energy level within the network node 110 may be monitored. The monitoring can be continuous, sampled, or periodically sampled. The energy level may decrease as the network node 110 functionality consumes energy. The energy level may increase as the energy generator 120 converts energy for storage and use within the network node 110.

At operation 425, certain operations of the network node 110 may be suspended while the energy level is at or below the memory threshold 230 as established in operation 415. Suspending some or all operations can support maintaining the memory or other state information within the network node 110 while energy is stored up to support resuming operation once the energy level rises above the memory threshold 230.

At operation 430, a message can be received from the network via the wireless transceiver 140. The type of message that is received can determine a branching to the next operation of the process 400.

If the message received at operation 430 is a reservation message, the process 400 can branch to operation 440 where energy can be reserved for a future critical message related to the reservation message. The reservation of energy can involve increasing one or more energy thresholds. For example increasing the transmit threshold 220 can effectively reserve the amount of energy involved in the increase by keeping that amount of energy off limits for use in message transmission. When the corresponding critical message arrives later, the transmit threshold 220, or other threshold, can be returned to its original state and the released energy difference may be used for handling the critical message.

At operation 445, the path through the network can be reserved at that network node 110. The path reservation may involve information at each network node 110 about the next hop network node 110 belonging to the reserved path. At operation 450, the process 400 can wait until the energy is greater than the transmit threshold 220 before transmitting, or relaying, the reservation message at operation 455. At operation 455, the reservation message can be relayed to the next hop network node 110 in the transmission path. After operation 455, the process 400 can loop back to operation 420 to repeat as discussed above.

If the message received at operation 430 is a critical message, the process 400 can branch to operation 460 where previously reserved energy may be released for use in transmitting the critical message. The reserved energy may have been set aside in operation 440 when the reservation message associated with the present critical message was processed. At operation 465, the released energy from operation 460 can be used to transmit, or relay, the present critical message to the next hop network node 110 along the reserved path. After operation 465, the process 400 can loop back to operation 420 to repeat as discussed above. The process 400 may also include repeatedly comparing the available energy level against the transmit threshold 220 and delaying message transmission if the threshold energy level is not available.

If the message received at operation 430 is a non-critical message, the process 400 can branch to operation 470 where the process 400 can wait until the energy is greater than the transmit threshold 220 before transmitting, or relaying, the non-critical message at operation 475. Since the message is non-critical, energy may not have been previously reserved for immediate release and instead the transmission of the message may be delayed until the energy level is acceptable for supporting transmission. After operation 475, the process 400 can loop back to operation 420 to repeat as discussed above.

Figure 5:
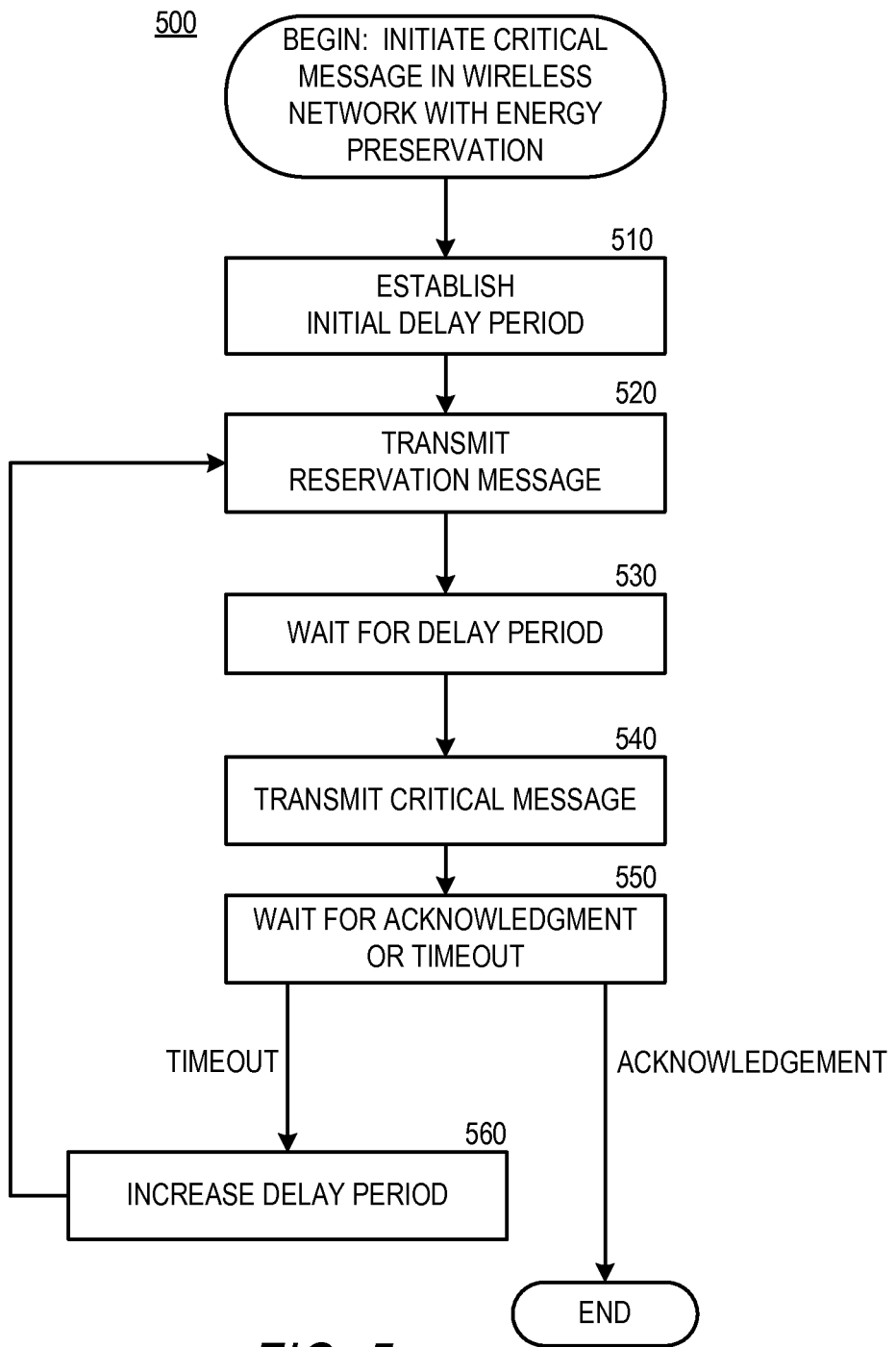
FIG. 5 is a flow diagram illustrating a process for initiating a critical message in a wireless network with energy reservation.

Referring now to FIG. 5, additional details are provided regarding the embodiments presented herein for energy reservation in power limited networks. In particular, FIG. 5 is a flow diagram illustrating aspects of a process 500 for initiating a critical message in a wireless network with energy reservation according to aspects of an embodiment presented herein. A critical message can be initiated at a source node 110A and targeted to a destination node 110E.

The process 500 begins at operation 510, where an initial delay period can be established. The delay period can correspond to a time interval between transmitting a reservation request and subsequently transmitting the associated critical message. During this delay, the network nodes 110 along the reserved path can build up the energy to be used for handling the critical message and associated acknowledgement messages.

At operation 520, a reservation message can be transmitted into the network 100. The reservation message can cause each network node 110 along the path from the source node 110A and the destination node 110E to reserve the path information and energy necessary to service the critical message associated with the reservation message. A critical message identifier may be used to associate the reserved resources at the network nodes 110 with the critical message that will arrive later.

At operation 530, the source node 110A can wait for the delay period before transmitting the critical message in operation 540. The delay period can allow time for the network nodes 110 to store up energy for servicing the critical message. At operation 550, the source node 110A can wait for either an acknowledgement message associated with the critical message transmitted in operation 540 or otherwise for a timeout to occur. If an acknowledgement is received at the source node 110A from the destination node 110E along the other nodes in the path, then the critical message was received and the process 500 can terminate after operation 550.

If instead, a timeout occurs before an acknowledgement of the critical message is received at the source node 110A, the process can continue to operation 560 where the delay period can be increased. Increasing the delay period can allow more time for additional energy to store up at the network nodes 110 for handling the critical message. After increasing the delay period, the process can loop back to operation 520 where the reservation and associated critical message can be attempted again using the increased delay period.

Figure 6:
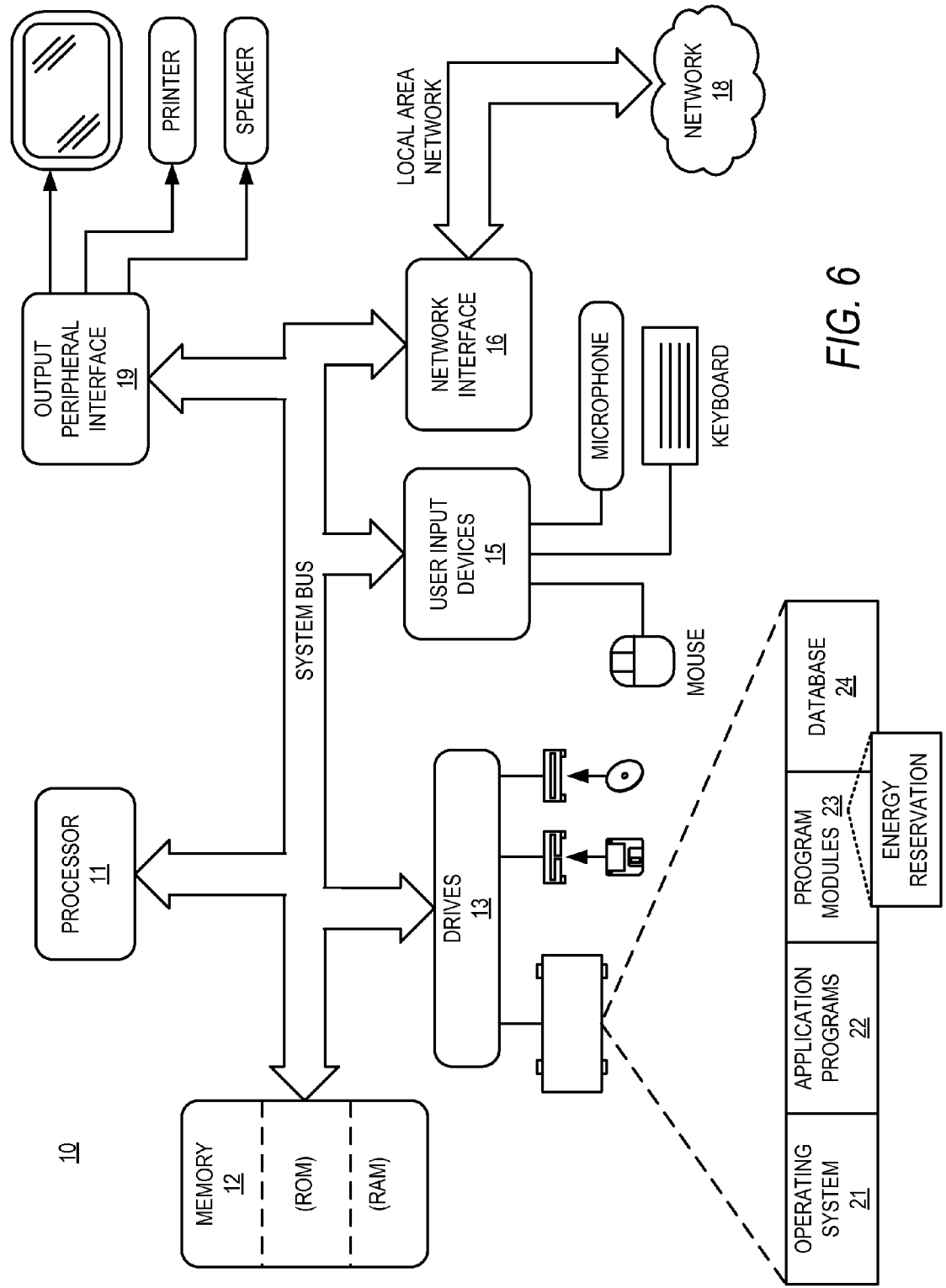
FIG. 6 is a computer architecture diagram showing an illustrative computer hardware and software architecture for a computing system capable of implementing an operating environment, all arranged according to at least some of the embodiments presented herein.

With reference to FIG. 6, an exemplary computing system is illustrated for implementing various embodiments. The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, the embedded controller 150, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used. The computer 10 may also connect to other systems through the wireless transceiver 140. The wireless transceiver 140 may interface to the network 100 by way of a wireless front end and one or more antennas.

According to one or more embodiments, computer 10 may be configured such that the processor 11 and/or program modules 23 can perform energy reservation in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23. The program modules 23 may include software instructions that, when loaded into the processor 11 and executed, transform a general-purpose computing system into a special-purpose computing system customized to facilitate energy reservation. For example, the program modules 23 may support energy reservation module 165, processing wireless network traffic with energy reservation 400, or initiating critical messages in wireless networks with energy reservation 500. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support energy reservation. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, components, compounds, or compositions which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method for processing wireless network traffic with varying energy availability, the method comprising:
    initializing a first energy level threshold for a network node, wherein the first energy level threshold represents a minimum energy level to transmit a non-critical message;
    monitoring an energy level of the network node;
    receiving a reservation request to reserve additional energy for processing a critical message having a higher priority of delivery than the non-critical message and specifying a next network node to which the critical message is to be transmitted;
    increasing the first energy level threshold by the additional energy to reserve energy for processing the critical message in response to receiving the reservation request;
    enabling transmission of the non-critical message in response to the monitored energy level being above the increased first energy level threshold;
    suspending transmission of the non-critical message in response to the monitored energy level being below the increased first energy level threshold;
    receiving the critical message from a previous network node;
    releasing the reserved additional energy to transmit the critical message to the next network node specified by the reservation request;
    decreasing the first energy level threshold by the additional energy following the transmission of the critical message;
    permitting system functions such that the monitored energy level falls below the first energy level threshold;
    suspending the system functions to avoid allowing the monitored energy level to fall below a second energy level threshold; and
    reserving energy within the network node in response to receiving the reservation request, wherein reserving energy comprises increasing the second energy level threshold, wherein the second energy level threshold is less than the first energy level threshold.

2. The method of claim 1, further comprising storing received messages in response to message transmission being suspended.

3. The method of claim 2, further comprising releasing stored messages in response to message transmission being enabled.

4. A non-transitory computer storage medium having computer executable instructions stored thereon which, when executed by a computer, cause the computer to:
    initialize a first energy level threshold for a network node, wherein the first energy level threshold represents a minimum energy level to transmit a non-critical message;
    monitor an energy level of the network node within a wireless network;
    increase the first energy level threshold by an additional energy to process a critical message having a higher priority of delivery than the non-critical message in response to receiving a reservation request to reserve the additional energy, the reservation request further specifying a next network node to which the critical message is to be transmitted;
    enable transmission of the non-critical message in response to the monitored energy level being above the increased first energy level threshold; and
    suspend transmission of the non-critical message in response to the monitored energy level being below the increased first energy level threshold;
    receive the critical message from a previous network node;
    release the reserved additional energy to transmit the critical message to the next network node specified by the reservation request;
    decrease the first energy level threshold by the additional energy following the transmission of the critical message;
    suspend system functions to avoid allowing the monitored energy level to fall below a second energy level threshold, wherein the second energy level threshold is less than the first energy level threshold; and
    reserve energy within the network node in response to receiving the reservation request, wherein reserving energy comprises increasing the second energy level threshold.

5. The computer storage medium of claim 4, further causing the computer to store received messages in response to message transmission being suspended.

6. The computer storage medium of claim 5, further causing the computer to release stored messages in response to message transmission being enabled.

7. A wireless network system, the system comprising:
    a source network node;
    a relay network node;
    a destination network node; and
    a controller module within the source network node operable to:
        establish a delay period representing an estimated time frame utilized by the relay node to build additional energy for relaying a critical message;
        transmit a reservation message, wherein the reservation message signals the relay network node to build the additional energy for relaying the critical message in addition to energy for relaying non-critical messages;
        wait for the delay period after transmitting the reservation message;

transmit the critical message after waiting for the delay period;
receive an acknowledgement of the critical message within a timeout period;
increase the delay period in response to failing to receive the acknowledgement within the timeout period;
retry the reservation and critical message transmission using the increased delay period in response to failing to receive the acknowledgement within the timeout period;
receive the critical message from a previous network node;
release the additional energy to transmit the critical message to a next network node specified by the reservation message;
decrease a first energy level threshold by the additional energy following the transmission of the critical message;
permit system functions such that the energy level of the relay network node falls below the first energy level threshold;
suspend the system functions to avoid allowing the energy level of the relay network node to fall below a second energy level threshold; and
reserve energy within the relay network node in response to receiving the reservation message, wherein reserving energy comprises increasing the second energy level threshold wherein the second energy level threshold is less than the first energy level threshold.

8. The system of claim 7, wherein the acknowledgement originates at the destination node.

9. The system of claim 7, wherein the reservation message further signals a path indicating other network nodes including the destination network node to which the relay network node relays the critical message.

10. The system of claim 7, wherein the controller module is further operable to:
receive a second acknowledgement of the critical message within the timeout period, wherein the second acknowledgement specifies a new delay period provided by the relay network node; and
increase the delay period to the new delay period specified in the second acknowledgement in response to receiving the second acknowledgement.

\* \* \* \* \*